United States Patent [19]

Winquist et al.

[11] Patent Number: 6,093,672
[45] Date of Patent: *Jul. 25, 2000

[54] NOBLE METAL HYDROCRACKING CATALYSTS

[75] Inventors: Bruce Herman Charles Winquist, Houston, Tex.; David Allen Cooper, Morrisville, Pa.

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/821,139

[22] Filed: Mar. 20, 1997

[51] Int. Cl.$^7$ ..................................................... B01J 29/06
[52] U.S. Cl. ................................ 502/64; 502/66; 502/70; 502/74; 502/79; 502/80; 502/84; 502/87; 423/325; 423/326; 423/327.1; 423/327.2; 423/328.1; 423/328.2; 423/628
[58] Field of Search ..................................... 423/324, 325, 423/326, 327.1, 327.2, 328.1, 328.2, 628; 502/64, 66, 70, 74, 79, 80, 84, 87

[56] References Cited

U.S. PATENT DOCUMENTS

| | | | |
|---|---|---|---|
| 3,897,327 | 7/1975 | Ward | 208/111 |
| 3,929,672 | 12/1975 | Ward | 252/455 Z |
| 4,308,129 | 12/1981 | Gladrow et al. | 208/120 |
| 4,429,053 | 1/1984 | Ward | 502/65 |
| 4,456,693 | 6/1984 | Welsh | 502/65 |
| 4,485,005 | 11/1984 | O'Hara | 208/111 |
| 4,556,646 | 12/1985 | Bezman | 502/66 |
| 4,565,621 | 1/1986 | Ward | 208/111 |
| 4,584,287 | 4/1986 | Ward | 502/65 |
| 4,654,317 | 3/1987 | Sachtler et al. | 502/74 |
| 4,857,169 | 8/1989 | Abdo | 208/59 |
| 4,882,307 | 11/1989 | Tsao | 502/66 |
| 5,001,097 | 3/1991 | Pecoraro | 502/68 |
| 5,041,401 | 8/1991 | Schoennagel et al. | 502/61 |
| 5,059,567 | 10/1991 | Linsten et al. | 502/64 |
| 5,073,530 | 12/1991 | Bezman et al. | 502/65 |
| 5,277,793 | 1/1994 | Bezman et al. | 208/111 |
| 5,348,924 | 9/1994 | Potter et al. | 502/66 |
| 5,364,514 | 11/1994 | Sanborn et al. | 208/58 |
| 5,366,617 | 11/1994 | Bradley et al. | 208/137 |
| 5,393,410 | 2/1995 | Habib et al. | 208/111 |
| 5,401,704 | 3/1995 | Absil et al. | 502/66 |
| 5,403,799 | 4/1995 | Miller et al. | 502/64 |
| 5,461,016 | 10/1995 | Bradley et al. | 502/66 |
| 5,536,687 | 7/1996 | Ward | 502/67 |

FOREIGN PATENT DOCUMENTS

| | | |
|---|---|---|
| 81774 | 6/1983 | European Pat. Off. . |
| 1506429 | 4/1978 | United Kingdom . |

*Primary Examiner*—Tom Dunn
*Assistant Examiner*—Cam N. Nguyen

[57] ABSTRACT

A noble metal hydrocracking catalyst which has high selectivity for naphtha range products is provided. The hydrocracking catalyst comprises:

a) from about 70 to about 90 weight percent of a Y zeolite, based on the catalyst having a silica to alumina mole ratio of from about 4.8 to less than 6.0, a unit cell constant within the range of about 24.50 to about 24.57, a $Na_2O$ level of less than or equal to about 0.2 weight percent;

b) from about 10 to about 30 weight percent, based on the catalyst of an alumina having a mercury intrusion pore volume within the range from about 0.55 to about 0.85 cc/g; and c) from about 0.5 to 1 weight percent, based on the catalyst of a noble metal; wherein said hydrocracking catalyst have a dispersivity of the noble metal of equal or greater than about 50% by hydrogen chemisorption measurement, a surface area of greater than or equal to 700 $m^2$/g by BET surface area measurement, a compacted bulk density within the range of from about 0.40 to 0.58 g/cc, and a mercury pore volume within the range of from about 0.4 to about 0.7 ml/g.

23 Claims, No Drawings

NOBLE METAL HYDROCRACKING CATALYSTS

FIELD OF THE INVENTION

This invention relates to manufacture of noble metal hydrocracking catalysts, and the catalysts produced by the process.

BACKGROUND OF THE INVENTION

Petroleum refiners produce desirable products, such as gasoline and turbine fuel, by catalytically hydrocracking high boiling hydrocarbons into product hydrocarbons of lower average molecular weight and boiling point. Hydrocracking is generally accomplished by contacting, in an appropriate reactor vessel, a gas oil or other hydrocarbon feedstock with molecular hydrogen in the presence of a suitable hydrocracking catalyst under appropriate conditions, including an elevated temperature and an elevated pressure, such that a hydrocarbon product is obtained containing a substantial proportion of a desired product boiling in a specified range.

Often, hydrocracking is carried out in the presence of a catalyst containing sulfided Ni—W or Ni—Mo metals. However, these catalysts produce a substantial amount of aromatic content. In some application, such as for jet fuel and diesel as such or as a blend a lower amount of aromatic content is desired.

In order to obtain a lower aromatic content hydrocracked product, noble metal hydrocracking catalyst is being used. However, the conventional noble metal catalysts have a substantial gas make ($C_1$ to $C_4$), thus lowering the desired liquid yield, i.e., within the range of from $C_5$ to hydrocarbons boiling at about 650° F.

It is desirable to provide a noble metal hydrocracking catalyst which will produce less gas and more liquid products under hydrocracking conditions.

SUMMARY OF THE INVENTION

A noble metal hydrocracking catalyst is provided, comprising:
  a) from about 70 to about 90 weight percent of a Y zeolite, based on the catalyst having a silica to alumina mole ratio of from about 4.8 to less than 6.0, a unit cell constant within the range of about 24.50 to about 24.57, a $Na_2O$ level of less than or equal to about 0.2 weight percent;
  b) from about 10 to about 30 weight percent, based on the catalyst of an alumina having a mercury intrusion pore volume within the range from about 0.55 to about 0.85 cc/g; and
  c) from about 0.5 to 1 weight percent, based on the catalyst of a noble metal; wherein said hydrocracking catalyst have a dispersivity of the noble metal of equal or greater than about 50% by hydrogen chemisorption measurement, a surface area of greater than or equal to 700 $m^2/g$ by BET surface area measurement, a compacted bulk density within the range of from about 0.40 to 0.58 g/cc, and a mercury pore volume within the range of from about 0.4 to about 0.7 ml/g.

Further, methods to prepare the noble metal hydrocracking catalyst is provided.

DETAILED DESCRIPTION OF THE INVENTION

It has been found that a noble metal hydrocracking catalyst which produces more desirable liquid product and less gas make (i.e., $C_1$–$C_4$ hydrocarbons), preferably at most 11 weight percent can be prepared by the steps comprising:
  a) ion exchanging a noble metal on a ultrastable Y zeolite powder by contacting a noble metal salt solution with the zeolite powder, preferably at a pH within the range of about 8.0 to about 8.5, for a time sufficient to exchange the noble metal ion to the zeolite to produce a noble metal containing Y zeolite powder;
  b) extruding the noble metal containing-Y zeolite powder with alumina, water, at least one peptizing aid, and at least one extrusion aid to produce an extrudate; and
  c) drying and calcining the extrudate at a temperature within the range of about 450° C. to about 550° C. to produce the noble metal hydrocracking catalyst.

The ultrastable Y zeolite powder useful in the invention are Y zeolite having silica to alumina mole ratio of from about 4.8, preferably from about 5.0, to below 6.0, preferably to about 5.8, more preferably to about 5.4. The unit cell constant of the powder is with the range of from about 24.50, preferably from about 24.52, to about 24.57, preferably to about 24.55. The preferred ultrastable Y zeolite powder have sodium level of less than or equal to about 0.25, preferably less than or equal to about 0.20 weight percent, calculated as $Na_2O$. The surface area of the zeolite is preferably within the range of from about 750, more preferably from about 780, to about 830, to more preferably to about 810 $m^2/g$. The surface area is determined by BET measurement at a relative pressure, $p/p_0$, of 0.01 to 0.05.

Preferred catalysts have high total acid site concentrations (Bronsted and Lewis acid sites) of at least 650 micromoles/gram, preferably at least 680 micromoles/gram, to preferably less than 1000 micromoles/g, more preferably less than 800 micromoles/g, as measured by titration of the catalyst with pyridine, the titration of the acid sites being followed by the measuring the integrated intensities of the infrared absorption peaks in the hydroxyl group stretching region. The method for determining acid site concentrations by adsorption of ammonia at temperatures in the range 200 to 400 C is described in the following publications: 1) M. A. Makarova and J. Dwyer, *Journal of Physical Chemistry*, 1993, 97, 6337; and 2) M. A. Makarova, A. Garforth, V. L. Zholobenko, J. Dwyer, G. J. Earl and D. Rawlence in *Zeolites and Related Microporous Materials: State of the Art* 1994, Studies in Surface Science and Catalysis, Vol. 84, 1994, Elsevier Science B.V., p. 365. The technique for acid site characterization with pyridine is similar to that described for ammonia in the indicated publications except for substitution of pyridine for ammonia.

The ultrastable Y zeolite (USY) used in the preparation of the catalyst of the invention can be made by at least partially ion-exchanging a sodium Y zeolite to reduce the level of sodium to about 3 weight percent of $Na_2O$, based on the zeolite, by conventional ion-exchange method (ion-exchange step) then heating the zeolite in the presence of stream at a partial pressure of 0.2 to 1.0 atmospheres at a temperature range of 600 to about 800° C. (steam calcination step). The ion-exchange is typically carried out by mixing the zeolite with an aqueous solution containing a dissolved ammonium salt, such as ammonium nitrate, ammonium sulfate, ammonium chloride, and the like, then stirring the resulting slurry for between about 0.5 to about 4 hours at a temperature above ambient but less than about 100° C. For a lower level of sodium content these steps are repeated at least once. The steam calcined zeolite is then ammonium ion-exchanged again to lower the $Na_2O$ content to the desired range of less than about 0.20 percent. U.S. Pat. No. 5,059,567 discloses these ultrastable Y-zeolites (USY) useful for the invention, the disclosure of which is hereby incorporated by reference.

Binders useful in the invention are aluminas, such as pseudoboehmite, gamma and bayerite aluminas. These binders are readily available commercially and are used to manufacture alumina-based catalysts. LaRoche Chemicals, through its VERSAL® family of aluminas and Vista Chemical Company, through its CATAPAL® aluminas, Criterion Catalyst Company, through its HMPA aluminas, provide suitable alumina powders which can be used as binders in preparing the instant catalysts. The preferred alumina has a mercury intrusion pore volume within the range of from about 0.55, preferably from about 0.65, to about 0.85 to about 0.76 cc/g. Preferred alumina binders to be used in the preparation of the catalyst, particularly when extrusion is utilized, are the high-dispersity alumina powders. Such high-dispersity aluminas have a dispersity index of greater than 50% in a aqueous acid dispersion having an acid content of 0.4 milligram equivalents of acid (acetic) per gram of $Al_2O_3$. Such high-dispersity aluminas are exemplified by vista's CATAPAL® D alumina and Criterion's HMPA alumina.

The noble metal salts can be palladium salts or platinum salts. The palladium salts are preferred. The palladium salts used in the invention preferably include, for example, organic amine complex salts and chloride salts such as palladium ammonium nitrate, palladium chloride, palladium diaminoethane nitrate, and palladium ammonium chloride and the like. The noble metal salt concentration is such as to achieve final noble metal concentration (as elemental palladium) in the catalyst within the range of 0.5, preferably 0.55, to 1.0 weight percent, to preferably 0.9 weight percent, as reduced metal to total catalyst.

The ion exchange solution is typically water but may contain a soluble ammonium salt or/and dilute aqueous ammonia.

The noble metal is incorporated by mixing the zeolite with the noble metal salt-solution, then stirring the resulting slurry for between about 0.5 to about 4 hour at a temperature of at or above ambient but less than 85° C. with the pH of the noble metal salt solution preferably within the range of about 8.0 to about 8.5, then dried by conventional drying methods such as spray drying and flash drying.

The noble metal containing-ultrastable Y zeolite component, alumina component, water, and extrusion aid component, and peptizing agent can be added in any order and extruded to an extrudate. The added mixture contains: i) from about 70 to about 90 weight percent, based on the catalyst dry weight, of a noble metal containing ultrastable Y-zeolite powder (USY powder); ii) from about 10 to about 30 weight percent of alumina, based on the catalyst dry weight; iii) an amount of water such that the mixture has a volatiles content (800° C. basis) from about 48 to about 55 weight percent, based on the wet mixture; iv) from about 0.5, preferably from about 1, to about 6, preferably to about 5, more preferably to about 2 weight percent of an extrusion aid (flow control agent), based on the mixture dry weight; and, v) from about 0.5, preferably from about 1, to about 6, preferably 5 weight percent of a peptizing agent, based on the mixture dry weight.

The peptizing agents can be an organic acid or an inorganic acid or a mixture thereof used in the extrusion of zeolite and alumina. An inorganic acid or a $C_2$ to $C_6$ organic acid is preferred as the peptizing agent. Typical peptizing agents include, for example, acetic acid, nitric acid, citric acid, oxalic acid, and the like.

The preferable extrusion aids are water soluble or dispersible polymeric flocculants. Preferable extrusion aids include, for example, Superfloc 16 Plus brand of polyacrylamide available from Cytec Industries, Methocel brand of polymethylcellulose available from Dow Chemical Company, and Jayfloc 837, a polyamine available from Calloway Chemical Company, and the like. These extrusion aids are readily available commercially.

The extrudate is then dried and calcined at a temperature within the range of about 150° C. to about 550° C. under conditions effective to obtain a noble metal dispersion of greater or equal to 50% by hydrogen chemisorption measurement and an LOI (loss on ignition) of less than about 3 weight percent. During the calcination step at temperatures above about 150° C., the heating must be conducted under oxidizing conditions. The term oxidizing conditions means the atmosphere has sufficiently high partial pressure of oxygen, i.e., under conditions that maintain at least a partial pressure of about 0.1 atmosphere. Methods of obtaining a highly dispersed noble metals are described in Regan, W. J., Chester, A. J., and Kerr, G. T., *J. Catal.*, 69, 89 (1981) and S. T Homeyer and W. M. H. Sachtler, *J. Catal.* 117, 91–101(1989).

The resulting noble metal hydrocracking catalyst will have a noble metal dispersion of greater than or equal to 50% by hydrogen chemisorption measurement. The noble metal hydrocracking catalyst typically has a surface area of greater or equal to 700 $m^2/g$ by BET measurement, a compacted bulk density within the range of from 0.40, preferably from 0.42, to 0.58, preferably to 0.57 g/cc, total mercury pore volume within the range of from about 0.4 mug to about 0.7 ml/g. Pore size distribution by mercury intrusion method for pore sizes of 40–100 Angstrom of less than 0.1 ml/g. For the preferred catalyst, the pore size distribution for 100–500 Angstrom is about 0.2 to about 0.4 ml./g, for 500–1500 Angstrom is from about 0.06 to about 0.16 ml/g, for 1500–10,000 Angstrom is from about 0.15 to about 0.25 ml/g, and for greater than 10,000 Angstrom is less than about 0.1 ml/g.

The prepared hydrocracking catalyst can be activated with hydrogen as is conventional in the art.

Hydrocracking conditions comprise temperatures ranging from about 100° C., preferably from about 150° C., more preferably from about 200° C., to about 500° C., preferably to about 450° C., more preferably to about 400° C., and pressures above about 40 atmospheres. The total pressure will typically range from about 100 to about 3500 psig. The hydrogen partial pressure will typically range from about 100, preferably from about 300, more preferably from about 600 psig, to about 3500, preferably to about 3000 psig. The hydrogen feed rate will typically range from about 1000, more preferably from about 2000, to about 15,000, more preferably to about 10,000 standard cubic feet per barrel ("SCF/BBL"). The feedstock rate will typically have a liquid hourly space velocity ("LHSV") ranging from about 0.05, preferably from about 0.1 to about 20, preferably to about 15, more preferably to about 10.

The catalyst of the invention produces low amounts of gas and more liquid products under hydrocracking conditions. Particularly, the catalyst produces high yield of hydrocarbons boiling within the range of $C_5$ to about 530 F for naphtha and jet range, particularly, a least 80 weight percent yield.

ILLUSTRATIVE EMBODIMENTS

The invention will be described by the following examples which are provided for illustrative purposes and are not to be construed as limiting the invention.

EXAMPLES

These examples demonstrate several embodiments of the invention. SAR in the examples stands for the molar $SiO_2/$ $Al_2O_3$ ratio. $Na_2O$ represents the soda content in weight percent (dry basis). Surface area in $m^2/g$ is measured by the BET method at a relative pressure, $p/p_0$, of 0.01 to 0.05. The palladium content is measured as elemental palladium in weight percent. Crystallinity is reported as percent relative to a reference USY standard. UCC stands for the zeolite unit cell constant in Angstroms. LOI stands for loss-on-ignition at the temperature indicated in weight percent.

Catalyst Preparation

Catalyst A 75.0 pounds of CBV-500 USY zeolite from PQ Zeolite B.V. (LOI @800° C. 20.0%) was added to 55 gallons of deionized water. The pH of the slurry was adjusted to 8.3 by addition of 10% aq. $NH_3$. 15.6 pounds of $Pd(NH_3)_4(NO_3)_2$ solution (3.17% wt palladium) was added to the slurry over a 30 minute period. During the addition of the palladium solution the pH was maintained between 8.0 and 8.5 by addition of 10% aqueous $NH_3$. After 90 minutes the zeolite was recovered by filtration; it was dried and milled in a flash dryer with an outlet temperature of 210° F.

| Properties of Zeolite | |
| --- | --- |
| Crystallinity | 95 |
| SAR | 5.3 |
| Na2O | 0.00 |
| Surface Area | 848 |
| Pd | 0.82 |
| LOI | 20.9 |

11.8 kg of the palladium ion exchanged CBV-500 zeolite, prepared above, was added to a 130 liter Littleford mixer along with 3.1 kg of deionized water and mixed for 2 minutes. 2.3 kg of HMPA alumina (LOI @1000° C. of 24–29%; $Na_2O$<0.05% w; $SO_4^-$<0.8% w) from Criterion Catalyst Company and 3.1 kg of deionized water was added and mixed for 2 minutes. 1.5 kg of deionized water and 187 gm of acetic acid was added and mixed 2 minutes. 0.4 kg of calcined fines and 91 gm of Methocel was added and mixed an additional 2 minutes. The mixture was then transferred to a 4" Bonnet extruder and extruded an 1/8" dieplate containing 174 holes. The catalyst was dried for 3 hours at 250° F. and calcined in flowing air at 500° C.

Catalyst B 75 pounds of CBV-500 USY zeolite from PQ Zeolites BV (LOI @800° C. 20.24%) was added to 55 gallons of deionized water. The pH of the slurry was adjusted to 8.3 by addition of 10% aq. $NH_3$. 16.7 pounds of $Pd(NH_3)_4(NO_3)_2$ solution {2.98% wt palladium} was added to the slurry over a 30 minute period. During the addition of the palladium solution the pH was maintained between 8.0 and 8.5 by addition of 10% aqueous $NH_3$. After 90 minutes the zeolite was recovered by filtration; it was dried and milled in a flash dryer with an outlet temperature of 210° F.

| Properties of Zeolite | |
| --- | --- |
| LOI | 22.3% |
| UCC | 24.55 |
| Crystallinity | 96 |
| Pd | 0.83% |

2.26 kg of HMPA alumina from Criterion Catalyst Co. (LOI at 1000° C. 28.5%), 11.79 kg of palladium ion exchanged CBV-500, prepared above, and 0.60 kg of calcined and milled fines were mixed in a mix muller for 5 minutes. 2.9 kg of deionized water along with 113 gm of Jayfloc 837 were added and mixed for 10 minutes. 142 gm of Methocel was then added and mixed for 10 minutes. Finally, 4.3 kg of deionized water along with 397 gm of acetic acid was added and mixed an additional 35 minutes. The mixture was then transferred to a 4" Bonnet extruder and extruded a 1/8" dieplate containing 174 holes. The catalyst was dried for 3 hours at 250° F. and calcined in flowing air at 500° C.

Catalyst C 75 pounds of CBV-500 USY zeolite from PQ Zeolites BV (LOI @800° C. 20.24%) was added to 55 gallons of deionized water. The pH of the slurry was adjusted to 8.3 by addition of 10% aq. $NH_3$. 16.7 pounds of $Pd(NH_3)_4(NO_3)_2$ solution {2.98% wt palladium} was added to the slurry over a 30 minutes period. During the addition of the palladium solution the pH was maintained between 8.0 and 8.5 by addition of 10% aqueous $NH_3$. After 90 minutes the zeolite was recovered by filtration; it was dried and milled in a flash dryer with an outlet temperature of 210° F.

| Properties of Zeolite | |
| --- | --- |
| LOI | 22.3% |
| UCC | 24.55 |
| Crystallinity | 96 |
| Pd | 0.83% |

2.26 kg of HMPA alumina from Criterion Catalyst Co. (LOI at 1000° C. 28.5%), 11.79 kg of palladium ion exchanged CBV-500, prepared above, and 0.60 kg of calcined and milled fines were mixed in a 130 liter Littleford mixer for 2 minutes. 2.9 kg of deionized water along with 113 gm of Jayfloc 837 were added and mixed for 2 minutes. 142 gm of Methocel was then added and mixed for 2 minutes. Finally, 4.3 kg deionized water and 397 gm of acetic acid were added and mixed an additional 16 minutes. The mixture was then transferred to a 4" Bonnet extruder and extruded a 1/8" dieplate containing 174 holes. The catalyst was dried for 3 hours at 250° F. and calcined in flowing air at 500° C.

Catalyst E 63.8 pounds of CBV-500 USY zeolite from PQ Zeolites BV (LOI 14%) was added to 55 gallons of deionized water. The pH of the slurry was adjusted to 8.5 by addition of 10% aq.NH3. 13.3 pounds of $Pd(NH_3)_4(NO_3)_2$ solution {3.4% wt palladium} was added over a 30 minute period. During addition of the palladium solution the pH was maintained between 8.0 and 8.5 by addition of 10% aqueous $NH_3$. After 90 minutes the zeolite was recovered by filtration; it was dried and milled in a flash dryer with an outlet temperature of 210° F.

| Properties of Zeolite | |
| --- | --- |
| Crystallinity | 99 |
| SAR | 5.4 |
| Na2O | 0.00 |
| Surface Area | 821 |
| LOI | 23.9 |

12.0 kg of palladium ion exchanged CBV-500, prepared above, and 2.26 kg of Criterion HMPA alumina were added to a mix muller and mixed for 5 minutes. 7.84 kg of deionized water and 0.362 kg acetic acid were added and mixed for 30 minutes. 0.6 kg of calcined fines and 57 gm of Superfloc 16 was added and mixed for 15 minutes. The mixture was transferred to a 4" Bonnet extruder and extruded a ⅛" dieplate containing 174 holes. The catalyst was dried for 3 hours at 250° F. and calcined in flowing air at 500° C.

Catalyst F 404 grams of CP300-56D USY (LOI @1000° C. of 26.28%) was added to 1454 grams of deionized water. The pH of the slurry was adjusted to 8.5 by dropwise addition of 5 N aqueous ammonia solution. 6.87 grams of $Pd(NH_3)_4(NO_3)_2$ was dissolved in 162 grams of deionized water and added to zeolite slurry during 30 minutes. Stirring was continued for 2 hours after addition of the palladium solution was complete. The palladium ion exchanged zeolite was recovered by filtration and dried at 125° C. for 16 hours.

The catalyst was prepared by adding 110.6 grams of the above palladium exchanged USY (LOI @1000° C. of 12.08%) to a mix muller and mulling for 10 minutes. 14.6 grams of Vista Catapal D alumina (LOI @1000° C. of 26.23%) was added to the muller and the mixture mulled for 6 minutes. A solution of 1.08 grams citric acid monohydrate in 99 grams deionized water was added to the muller and mulled 6 minutes. 4 grams of Methocel was added to the mix muller and mulled for 3 minutes. The mixture was transferred to a 1 inch Bonnot extruder and extruded. The catalyst pellets were dried 16 hours at 125° C. overnight and calcined in flowing air by raising the catalyst temperature from 125 to 500° C. in 4 hours and holding at 500° C. for 2 hours. During this period 10 liters air/gram catalyst was passed through the catalyst bed.

Catalyst G 404 grams of CP300-56D USY (LOI @1000° C. of 26.28%) was added to 1454 grams of deionized water. The pH of the slurry was adjusted to 8.5 by dropwise addition of 5 N aqueous ammonia solution. 7.72 grams of $Pd(NH_3)_4(NO_3)_2$ was dissolved in 162 grams of deionized water and added to zeolite slurry during 30 minutes. Stirring was continued for 2 hours after addition of the palladium solution was complete. The palladium ion exchanged zeolite was recovered by filtration and dried at 125° C. for 16 hours.

The catalyst was prepared by adding 111.4 grams of the above palladium exchanged USY (LOI @1000° C. of 12.03%) to a mix muller and mulling for 10 minutes. 33.2 grams of Vista Catapal D alumina (LOI @1000° C. of 26.23%) was added to the muller and the mixture mulled for 6 minutes. A solution of 1.23 grams acetic acid in 104 grams deionized water was added to the muller and mulled 6 minutes. 4 grams of Methocel was added to the mix muller and mulled for 3 minutes. The mixture was transferred to a 1 inch Bonnot extruder and extruded. The catalyst pellets were dried 16 hours at 125° C. overnight and calcined in flowing air by raising the catalyst temperature from 125 to 500° C. in 4 hours and holding at 500° C. for 2 hours. During this period 10 liters air/gram catalyst was passed through the catalyst bed.

Catalyst H 397 grams of CP300-56D USY (LOI @1000° C. of 24.90%) was added to 1428 grams of deionized water. The pH of the slurry was adjusted to 8.5 by dropwise addition of 5 N aqueous ammonia solution. 6.87 grams of $Pd(NH_3)_4(NO_3)_2$ was dissolved in 159 grams of deionized water and added to zeolite slurry during 30 minutes. Stirring was continued for 2 hours after addition of the palladium solution was complete. The palladium ion exchanged zeolite was recovered by filtration and dried at 125° C. for 16 hours. The catalyst was prepared by adding 114.6 grams of the above palladium exchanged USY (LOI @1000° C. of 15.32%) to a mix muller and mulling for 10 minutes. 14.6 grams of Vista Catapal D alumina (LOI @1000° C. of 26.23%) was added to the muller and the mixture mulled for 6 minutes. A solution of 1.08 grams citric acid monohydrate in 90 grams deionized water was added to the muller and mulled 6 minutes. 4 grams of Methocel was added to the mix muller and mulled for 3 minutes. The mixture was transferred to a 1 inch Bonnot extruder and extruded. The catalyst pellets were dried 16 hours at 125° C. overnight and calcined in flowing air by raising the catalyst temperature from 125 to 500° C. in 4 hours and holding at 500° C. for 2 hours. During this period 10 liters air/gram catalyst was passed through the catalyst bed.

Catalyst I

The palladium ion exchanged zeolite used in preparation of Catalyst E was used in this catalyst preparation. 11.3 kg of the palladium ion exchanged CBV-500 and 3.0 kg Criterion HMPA alumina were added to a mix muller and mixed for 5 minutes. 7.79 kg deionized water and 0.363 kg acetic acid were added and mixed for 30 minutes. 0.6 kg of calcined fines and 57 gm of Superfloc 16 was added and mixed for 15 minutes. The mixture was transferred to a 4" Bonnet extruder and extruded a ⅛" dieplate containing 174 holes. The catalyst was dried for 3 hours at 250° F. and calcined in flowing air at 500° C.

Catalyst J 71.4 pounds of CP300-56D USY zeolite from Zeolyst International (LOI @800° C. 23.0%) was added to 55 gallons deionized water. The pH of the slurry was adjusted to 8.3 by addition of 10% aqueous $NH_3$. 13.3 pounds of $Pd(NH_3)_4(NO_3)_2$ solution {3.4% wt palladium} was added to the slurry over a 30 minute period. During the addition of the palladium solution the pH was maintained between 8.0 and 8.5 by addition of 10% aq.NH3. After 90 minutes the zeolite was recovered by filtration; it was dried and milled in a flash dryer with an outlet temperature of 210° F.

| Properties of Zeolite | |
|---|---|
| Crystallinity | 97 |
| SAR | 7.1 |
| Na2O | 0.00 |
| Surface Area | 843 |
| Pd | 0.82 |

8.59 kg of the palladium ion exchanged CP300-56D, prepared above, and 2.41 kg of Criterion HMPA alumina were added to a mix muller and mixed for 5 minutes. 6.72 kg deionized water and 0.290 kg acetic acid were added and mixed for 30 minutes. 0.45 kg of calcined fines and 45 gm of Superfloc 16 were added and mixed for 15 minutes. The mixture was transferred to a 4" Bonnet extruder and extruded a ⅛" dieplate containing 174 holes. The catalyst was dried for 3 hours at 240° F. and calcined in flowing air at 500° C.

Catalyst Activation Step

The catalyst is activated in the reactor by introducing flow of hydrogen over the catalyst at a rate of 60 liter/hr for a catalyst charge of 10 grams (ca. 20 cc). The reactor pressure is raised to 1450 psig at room temperature, after which the temperature is raised from room temperature to 750° F. in 12 hours and held at 750° F. for 6 hours. The temperature is then lowered to 300° F. and the hydrogen rate adjusted to the target flow rate, 48.5 liters/hour for 8000 SCF hydrogen/bbl.

Catalyst Performance Test

The catalyst was tested in once-through mode with fresh hydrogen at process conditions of 1.7 LHSV (l/l-hr), 1450 psig total pressure, 8000 scf hydrogen/bbl feed (100% hydrogen) with 5000 ppm sulfur added as dimethyldisulfide to the feedstock. The feedstock was second cracking reactor feed obtained from a commercial hydrocracker with a density of 0.8117 g/cc, a hydrogen content of 13.8444% w, less than 1 ppm by weight organic nitrogen and sulfur with the boiling characteristics indicated in the table below:

| ASTM D-2887 Simulated Distillation % Overhead | Degrees F. |
|---|---|
| 5 | 336 |
| 30 | 402 |
| 50 | 441 |
| 70 | 503 |
| 95 | 653 |

Conversion to 375 F.- was varied over a range of about 40 to 70% w. Catalyst activities and selectivities were compared at 60% conversion to 375 F.- products.
% yield = weight product cut/weight feed * 100%

| | Catalyst: | | |
|---|---|---|---|
| | A | B | C |
| USY Source | CBV 500 | CBV 500 | CBV 500 |
| USY Amount, % w | 85 | 85 | 85 |
| Alumina | Criterion HMPA | Criterion HMPA | Criterion HMPA |
| Surface Area, m²/g | 729 | 732 | n.a. |
| Palladium, % weight | 0.7 | 0.7 | 0.7 |
| Palladium Dispersion, Percent | 66 | n.a. | n.a. |
| Compacted Bulk Density, g/cc | 0.494 | 0.568 | 0.564 |
| Pore Volume, Nitrogen, ml/g | 0.430 | 0.396 | n.a. |
| Pore Volume, Mercury, ml/g | 0.6782 | 0.4401 | 0.4171 |
| Pore Size Distribution, Mercury Intrusion, ml/g | | | |
| 40–100 Å | 0.0855 | 0.0637 | 0.0582 |
| 100–500 Å | 0.0392 | 0.0311 | 0.0302 |
| 500–1500 Å | 0.0829 | 0.1231 | 0.0975 |
| 1500–10,000 Å | 0.3681 | 0.2047 | 0.2095 |
| >10,000 Å | 0.1025 | 0.0175 | 0.0217 |
| Product Yields, % weight, at 60% Conversion to 375° F. | | | |
| $C_1$–$C_4$ | 9.68 | 9.96 | 10.54 |
| $C_5$–180° F. | 15.69 | 15.16 | 16.35 |
| 180–320° F. | 30.14 | 29.47 | 29.08 |
| 320–530° F. | 36.34 | 37.20 | 35.81 |

| | Catalyst: | | |
|---|---|---|---|
| | E | F | G |
| USY Source | CBV 500 | CP300-56D | CP300-56D |
| USY Amount, % w | 85 | 90 | 80 |
| Alumina Peptizing Agent | Criterion HMPA Acetic Acid | Vista Catapal D Citric Acid | Vista Catapal D Acetic Acid |
| Bronsted and Lewis Acid Sites, micromoles/gram | n.a. | 746 | n.a. |
| Surface Area, m²/g | 704 | n.a. | n.a. |
| Palladium, % weight | 0.7 | 0.7 | 0.7 |
| Palladium Dispersion, Percent | 49 | 68 | 38 |
| Compacted Bulk Density, g/cc | 0.532 | n.a. | n.a. |
| Product Yields, % weight, at 60% Conversion to 375° F. | | | |
| $C_1$–$C_4$ | 9.46 | 10.69 | 11.55 |
| $C_5$–180° F. | 14.49 | 15.45 | 16.52 |
| 180–320° F. | 30.35 | 26.67 | 25.68 |
| 320–530° F. | 37.43 | 37.91 | 36.44 |

| | Catalyst: | | |
|---|---|---|---|
| | H | I | J |
| USY Source | CP300-56D | CBV 500 | CP300-56D |
| USY Amount, % w | 90 | 80 | 85 |
| Alumina Peptizing Agent | Vista Catapal D Citric Acid | Criterion HMPA Acetic Acid | Cnterion HMPA Acetic Acid |
| Bronsted and Lewis Acid Sites, micromoles/gram | 590 | n.a. | n.a. |
| Surface Area, m²/g | n.a. | 700 | 694 |
| Palladium, % weight | 0.7 | 0.7 | 0.7 |
| Palladium Dispersion, Percent | 52 | 46 | n.a. |
| Compacted Bulk Density, g/cc | n.a. | 0.517 | 0.550 |
| Product Yields, % weight, at 60% Conversion to 375° F. | | | |
| $C_1$–$C_4$ | 13.29 | 11.55 | 9.03 |
| $C_5$–180° F. | 17.57 | 17.41 | 13.93 |
| 180–320° F. | 24.06 | 27.79 | 30.58 |
| 320–530° F. | 35.73 | 34.81 | 38.74 |

As seen in the table Catalysts A, B, C, E, F and J of the invention have low $C_1$–$C_4$ gas yields, less than 11% w, based on feed. Catalysts G and I have low palladium dispersion and have high gas makes, greater than 11% w, based on feed. Example F has a higher concentration of Bronsted and Lewis acid sites, compared to Catalyst H and has a low $C_1$–$C_4$ gas yield.

We claim:
1. A hydrocracking catalyst comprising:
   a) from about 70 to about 90 weight percent of a Y zeolite, based on the catalyst having a silica to alumina mole ratio of from about 4.8 to less than 6.0, a unit cell constant within the range of about 24.50 to about 24.57, a $Na_2O$ level of less than or equal to about 0.25 weight percent;
   b) from about 10 to about 30 weight percent, based on the catalyst of an alumina having a pore volume (by mercury intrusion method) within the range of about 0.55 to about 0.85 cc/g; and
   c) from about 0.5 to 0.9 weight percent, based on the catalyst of a noble metal; wherein said hydrocracking catalyst have a dispersivity of the noble metal of equal or greater than about 50% by hydrogen chemisorption measurement, a surface area of greater than or equal to 700 m²/g by BET measurement, a compacted bulk density within the range of from 0.40 to 0.58 g/cc, and a pore volume (by mercury intrusion method) within the range of from about 0.4 to about 0.7 ml/g.

2. The catalyst of claim 1 wherein the noble metal is palladium.

3. The catalyst of claim 2 wherein the silica to alumina mole ratio of the Y zeolite is within the range of about 4.8 to about 5.8.

4. The catalyst of claim 3 wherein the total acid site concentration of the catalyst is at least 650 micromoles/gram.

5. The catalyst of claim 2 wherein the pore size distribution (by mercury intrusion method) of the catalyst for pore sizes of 40–100 Angstrom is less than about 0.1 ml/g.

6. The catalyst of claim 5 wherein the pore size distribution (by mercury intrusion method) of the catalyst for pore sizes 100–500 Angstrom is within the range of about 0.02 to about 0.04 ml/g.

7. The catalyst of claim 6 wherein the pore size distribution (by mercury intrusion method) of the catalyst for pore sizes of 500–1500 Angstrom is within the range of about 0.06 to about 0.16 ml/g.

8. The catalyst of claim 7 wherein the pore size distribution (by mercury intrusion method) of the catalyst for pore sizes of 1500–10,000 Angstrom is within the range of about 0.15 to about 0.25 ml/g.

9. The catalyst of claim 1 wherein the alumina has a dispersity index of greater than 50%.

10. A process for producing a noble metal hydrocracking catalyst comprising the steps of:
  a) ion exchanging a noble metal on a ultrastable Y zeolite powder having a silica to alumina ratio of about 4.8 to less than 6.0, a unit cell constant within the range of about 24.50 to about 24.57, a $Na_2O$ level of less than or equal to about 0.2 weight percent, and a surface area within the range of about 750 to about 840 $m^2/g$ by contacting a noble metal salt solution with the zeolite powder to produce a noble metal containing Y zeolite powder;
  b) extruding a mixture comprising i) from about 70 to about 90 weight percent, based on the catalyst (dry basis), of the noble metal containing-Y zeolite powder, ii) from about 10 to about 30 weight percent based on catalyst (dry basis) of an alumina having a pore volume (by mercury intrusion method) within the range of about 0.55 to about 0.85 cc/g, iii) a sufficient amount of water such that the mixture has a volatiles content (800° C. basis) of from about 48 to about 54 weight percent, based on the wet mixture, iv) from about 0.5 to about 6 weight percent, based on the catalyst (dry basis), of an extrusion aid, and v) from about 0.5 to about 6 weight percent, based on the catalyst (dry basis), of at least one peptizing agent to produce an extrudate;
  c) drying and calcining the extrudate at a temperature within the range of about 150° C. to about 550° C. to produce the noble metal hydrocracking catalyst.

11. The process of claim 10 wherein the extrusion aid is a water soluble or dispersible polymer useful for extruding the mixture.

12. The process of claim 11 wherein the extrusion aid is selected from the group consisting of polyacrylamides, polymethylcellulose and polyamines.

13. The process of claim 10 wherein the peptizing agent is an organic acid or an inorganic acid useful for peptizing the mixture for extrusion.

14. The process of claim 10 wherein the silica to alumina mole ratio of the ultrastable-Y zeolite powder is within the range of about 4.8 to about 5.8.

15. The process of claim 10 wherein step c), calcination is carried out under oxidizing conditions.

16. The process of claim 10 wherein the noble metal salt solution is a solution comprising a palladium salt.

17. The process of claim 16 wherein the noble metal salt solution is an aqueous solution comprising a palladium salt.

18. The noble metal hydrocracking catalyst produced by the process of claim 17.

19. The process of claim 16 wherein the noble metal salts are selected from the group consisting of palladium tetrammine nitrate, palladium chloride, palladium diaminoethane nitrate, and palladium ammonium chloride.

20. The process of claim 19 wherein the alumina has a dispersivity index of greater than 50%.

21. The process of claim 10 wherein the surface area of the ultrastable Y zeolite powder is within the range of from about 780 to about 830 $m^2/g$.

22. The noble metal hydrocracking catalyst produced by the process of claim 21.

23. The noble metal hydrocracking catalyst produced by the process of claim 10.

* * * * *